United States Patent
Yokouchi

(10) Patent No.: US 9,030,717 B2
(45) Date of Patent: May 12, 2015

(54) IMAGE READING APPARATUS, COMPRESSION-RATIO DETERMINATION METHOD, AND COMPUTER-READABLE, NON-TRANSITORY MEDIUM

(71) Applicant: PFU Limited, Kahoku-shi, Ishikawa (JP)

(72) Inventor: Shigeyuki Yokouchi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 14/156,195

(22) Filed: Jan. 15, 2014

(65) Prior Publication Data

US 2014/0347704 A1    Nov. 27, 2014

(30) Foreign Application Priority Data

May 27, 2013   (JP) ................. 2013-111371

(51) Int. Cl.
   *H04N 1/04*    (2006.01)
   *H04N 1/00*    (2006.01)

(52) U.S. Cl.
   CPC ................ *H04N 1/00095* (2013.01)

(58) Field of Classification Search
   CPC .............. H04N 2201/33357; H04N 19/00775; H04N 2201/0093; H04N 19/00121; H04N 19/00781
   USPC ............. 375/E7.226, E7.13, E7.181, E7.038, 375/E7.093, E7.172, E7.237; 382/236, 238, 382/243, 251; 358/426.01, 426.03, 426.04, 358/426.08
   See application file for complete search history.

(56) References Cited

U.S. PATENT DOCUMENTS

| | | | | |
|---|---|---|---|---|
| 4,229,768 A * | 10/1980 | Kurahayashi et al. | ........ | 382/235 |
| 5,420,940 A * | 5/1995 | Sedlar et al. | ........ | 382/276 |
| 5,598,354 A * | 1/1997 | Fang et al. | ........ | 708/203 |
| 5,724,475 A * | 3/1998 | Kirsten | ........ | 386/294 |
| 5,796,411 A * | 8/1998 | Cyman et al. | ........ | 345/502 |
| 5,812,700 A * | 9/1998 | Fang et al. | ........ | 382/239 |
| 6,553,143 B2 * | 4/2003 | Miyake et al. | ........ | 382/239 |
| 6,563,955 B2 * | 5/2003 | de Queiroz | ........ | 382/239 |
| 7,193,741 B2 * | 3/2007 | Nozaki | ........ | 358/1.16 |
| 7,248,775 B2 * | 7/2007 | Tsunoda | ........ | 386/241 |
| 7,454,122 B2 * | 11/2008 | Ko et al. | ........ | 386/291 |
| 8,024,669 B2 * | 9/2011 | Hitosuga | ........ | 715/835 |
| 8,194,933 B2 * | 6/2012 | Lei et al. | ........ | 382/112 |
| 8,472,730 B2 * | 6/2013 | Yoshida et al. | ........ | 382/232 |
| 8,540,158 B2 * | 9/2013 | Lei et al. | ........ | 235/454 |
| 8,805,069 B2 * | 8/2014 | Li et al. | ........ | 382/166 |
| 2011/0072341 A1 * | 3/2011 | Hino | ........ | 715/255 |
| 2012/0151545 A1 * | 6/2012 | Hsu et al. | ........ | 725/115 |

FOREIGN PATENT DOCUMENTS

| | | |
|---|---|---|
| JP | 2005-86543 | 3/2005 |
| JP | 2011-188068 | 9/2011 |

* cited by examiner

*Primary Examiner* — Negussie Worku
(74) *Attorney, Agent, or Firm* — Christie, Parker & Hale, LLP

(57) ABSTRACT

Provided are an image reading apparatus, a compression-ratio determination method and a computer-readable, non-transitory medium that can determine a compression ratio such that the data amount after compression would be optimal. The image reading apparatus includes an image generator for generating an input image by reading a document, a document-type identification module for identifying a type of the document, and an image compressor for compressing the input image, wherein the image compressor determines a compression ratio for compressing the input image, based on the type of the document.

10 Claims, 13 Drawing Sheets

IMAGE READING APPARATUS, COMPRESSION-RATIO DETERMINATION METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2013-111371, filed on May 27, 2013, the entire contents of which are incorporated herein by reference.

TECHNICAL FIELD

Embodiments discussed in the present specification relate to image processing technology.

BACKGROUND

In general, an image reading apparatus such as a scanner reads a document, temporarily stores the image data of the document in a storage, and then transmits the image data to an information processing apparatus such as a personal computer. When it takes a long time to transmit the image data to the information processing apparatus and the size of the image data that is not transmitted yet exceeds the storage capacity, the image reading apparatus interrupts the process of reading the document. The image reading apparatus is able to suppress interruption of the document-reading process, by reducing the amount of communication between the image reading apparatus and the information processing apparatus through compression of the image data, for example. However, the data amount after compression of the image data varies according to the amount of the image data and the like before compression. For this reason, data amount after compression is not always appropriate.

The following compression-ratio determination device has been disclosed (refer to Japanese Laid-open Patent Publication No. 2011-188068). Specifically, the compression-ratio determination device determines a compression ratio based on the amount of image data obtained by reading a document and communication capacity information so that the amount of data transmitted per predetermined time period would be larger than the amount of data read per predetermined time period.

In addition the above, the following image reading apparatus has been disclosed (refer to Japanese Laid-open Patent Publication No. 2005-86543). Specifically, the image reading apparatus estimates the compression ratio that is to be used for actually reading a document, based on the compression ratio of a preview image generated by reading the document at a low resolution, and then selects the optimal speed for reading the document, based on the estimated compression ratio and the effective transfer rate of the interface circuit.

The amount of image data after compression varies according to the document, and therefore is not necessarily optimal.

SUMMARY

Accordingly, it is an object of the present invention to provide an image reading apparatus and a compression-ratio determination method that can determine a compression ratio such that the data amount after compression would be optimal, and a computer-readable, non-transitory medium storing a computer program for causing a computer to implement such a compression-ratio determination method.

According to an aspect of the apparatus, there is provided an image reading apparatus. The image reading apparatus includes an image generator for generating an input image by reading a document, a document-type identification module for identifying a type of the document, and an image compressor for compressing the input image, wherein the image compressor determines a compression ratio for compressing the input image, based on the type of the document.

According to an aspect of the method, there is provide a compression-ratio determination method by using a computer. The compression-ratio determination method includes generating an input image by reading a document, identifying, using a computer, a type of the document, and compressing the input image, wherein the computer determines a compression ratio for compressing the input image based on the type of the document in the compressing step.

According to an aspect of the computer-readable, non-transitory medium storing a computer program, the computer program causes a computer to execute a process, including generating an input image by reading a document, identifying a type of the document, and compressing the input image, wherein the computer determines a compression ratio for compressing the input image based on the type of the document in the compressing step.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an image reading apparatus, a compression-ratio determination method, and computer program according to an embodiment, will be described with reference to the drawings. However, note that the technical scope of the invention is not limited to these embodiments and extends to the inventions described in the claims and their equivalents.

Figure 1:
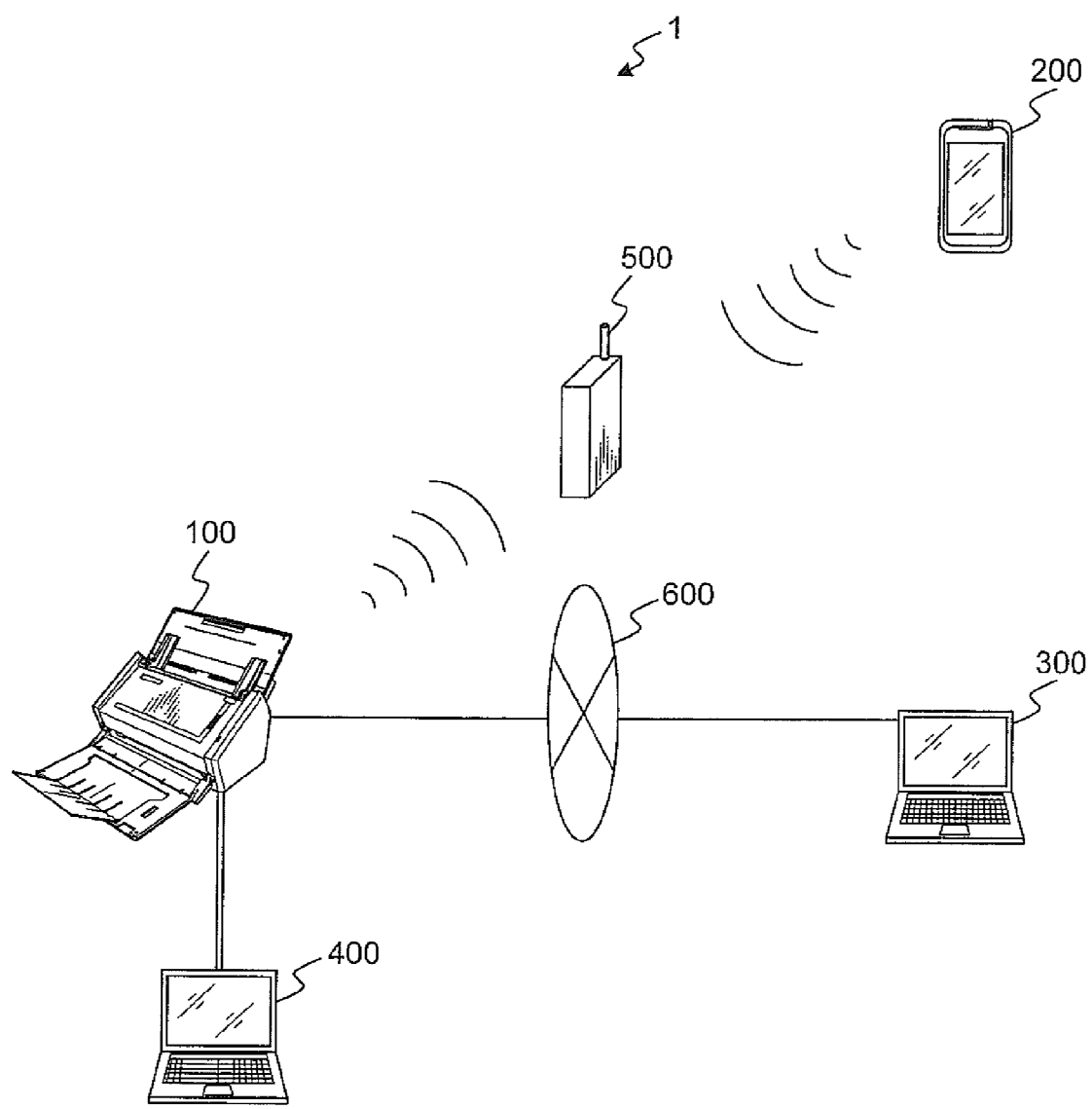
FIG. 1 is a schematic configuration diagram illustrating the configuration of an image processing system 1 according to an embodiment.

FIG. 1 is a diagram illustrating an image processing system 1 according to an embodiment.

The image processing system 1 includes an image reading apparatus 100, a first information processing apparatus 200, a second information processing apparatus 300, and a third information processing apparatus 400. The image reading apparatus 100 is wirelessly connected to the first information processing apparatus 200 via an access point 500, connected to the second information processing apparatus 300 via a wired communication network 600 such as a wired local area network (LAN), and connected to the third information processing apparatus 400 via a wire. The access point 500 is connected to the image reading apparatus 100 and the first information processing apparatus 200 via wireless communication and functions as a network switch. The image reading apparatus 100 is an image scanner or a digital camera, for example. The first information processing apparatus 200 is a personal digital assistant, for example. The second information processing apparatus 300 and the third information processing apparatus 400 are personal computers, for example.

Figure 2A:
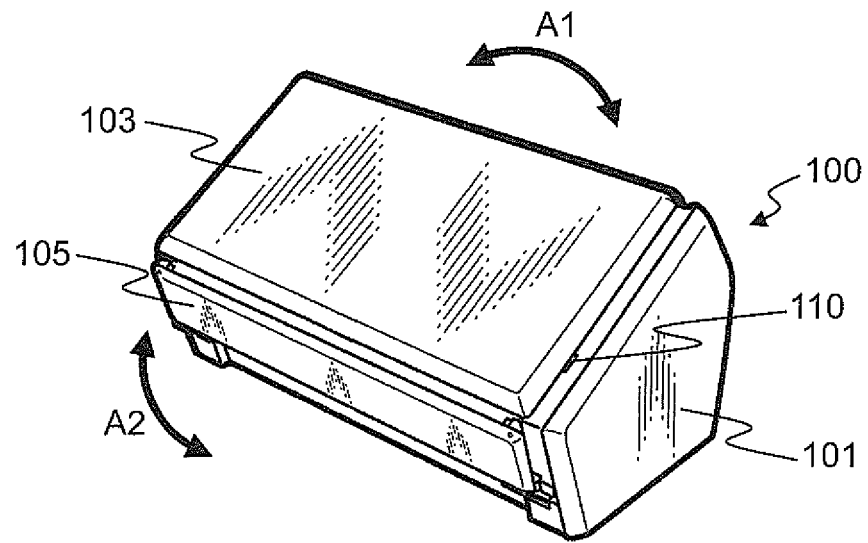
FIG. 2A is a perspective view of an image reading apparatus 100 when a document tray is not set up.
Figure 2B:
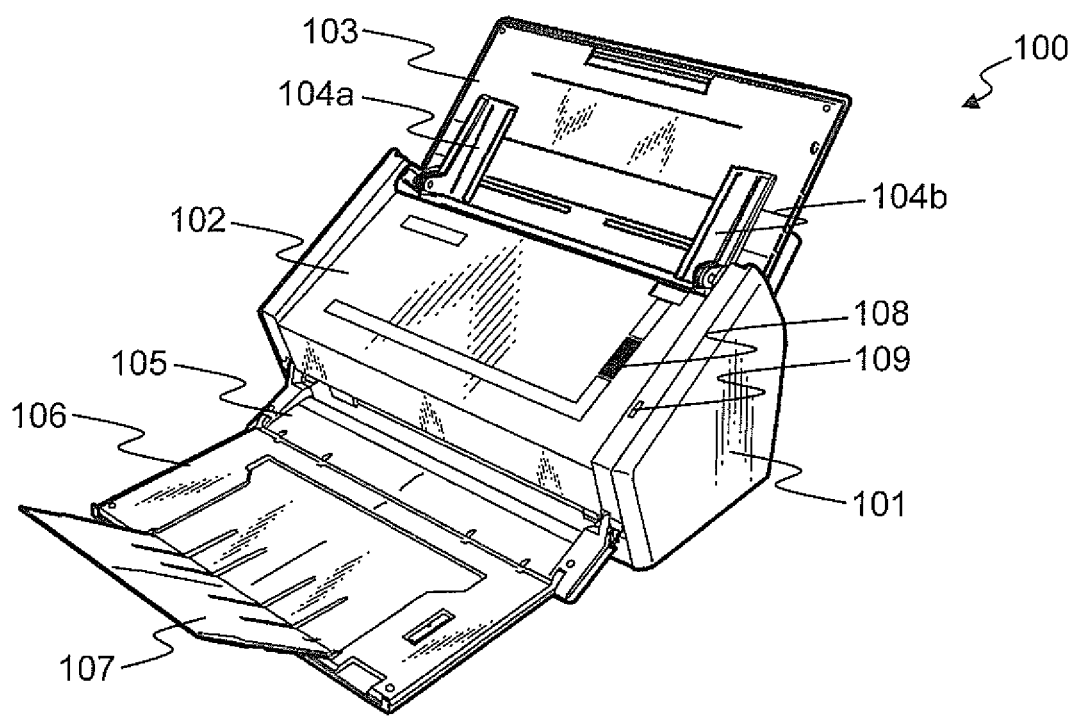
FIG. 2B is a perspective view of the image reading apparatus 100 when the document tray is set up.

FIG. 2A is a perspective view of the image reading apparatus 100 when a document tray is not set up, and FIG. 2B is a perspective view of the image reading apparatus 100 when the document tray is set up.

The image reading apparatus 100 includes a housing 101, a top part 102, a document tray 103, a front cover 105, a top cover 106, an auxiliary cover 107, an operation button 108, an opening/closing detector 109, and the like.

The housing 101 forms the outer shape of the image reading apparatus 100 together with the top part 102, the document tray 103, the front cover 105, the top cover 106, and the auxiliary cover 107.

The top part 102 is disposed in a position so as to cover the top face of the image reading apparatus 100, and is engaged with the housing 101 by use of a hinge to be openable and closable when the image reading apparatus 100 is jammed, or to be cleaned inside, for example.

The document tray 103 is engaged with the housing 101 by use of a hinge rotatable in the direction indicated by an arrow A1 in FIG. 2A. The document tray 103 is disposed in a position so as to cover the top part 102, the top cover 106, and the auxiliary cover 107, and thereby functions as an outer cover, in the state illustrated in FIG. 2A. In contrast, in the state illustrated in FIG. 2B, the document tray 103 is disposed so that a document can be placed on the document tray 103. The document tray 103 is provided with document guides 104a and 104b, which are slidable rightward and leftward with respect to the direction in which the document is fed. Positioning the document guides 104a and 104b to correspond with the width of the document can prevent the document from moving rightward or leftward.

The front cover 105 is engaged with the housing 101 by use of a hinge to be rotatable in the direction indicated by an arrow A2 in FIG. 2A. As to the top cover 106, one end is connected to the front cover 105, while the other end is connected to the auxiliary cover 107. The auxiliary cover 107 is folded out from the top cover 106 as appropriate, to hold the document.

The operation button 108 is provided at a surface of the top part 102, and generates and outputs an operation detection signal when being pressed.

The opening/closing detector 109 includes a sensor disposed in a position facing the document tray 103 in a closed state, and detects an opening/closing state of the document tray 103. The opening/closing detector 109 generates and outputs an opening/closing detection signal having a different signal value depending on whether the document tray 103 is in an open state or a closed state.

Figure 3:
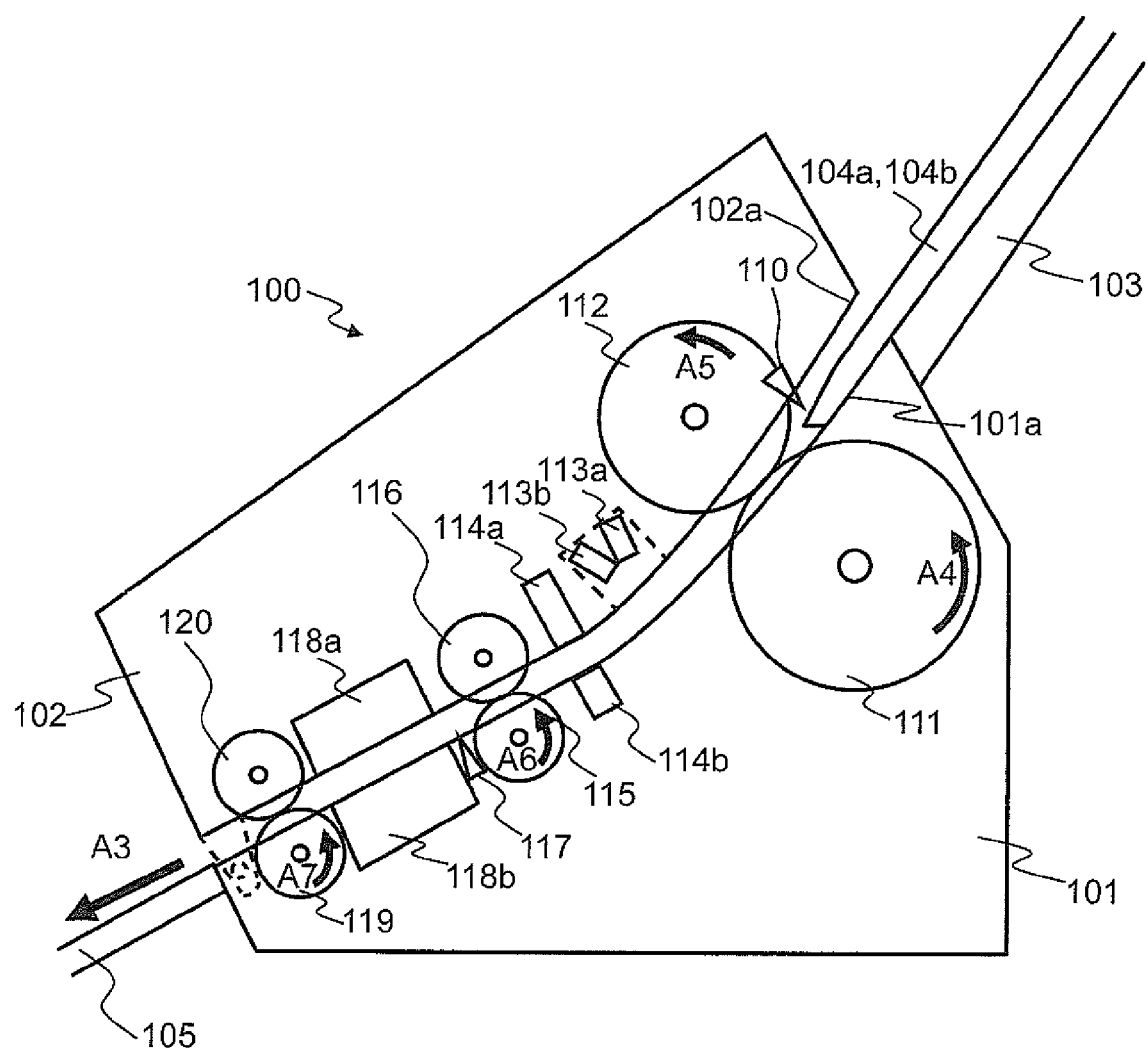
FIG. 3 is a diagram for illustrating an example of a conveyance path in the image reading apparatus 100.

FIG. 3 is a diagram for illustrating an example of a conveyance path in the image reading apparatus 100.

The conveyance path in the image reading apparatus 100 is provided with a first document detector 110, a feed roller 111, a retard roller 112, an infrared irradiation module 113a, an infrared reception module 113b, an ultrasonic transmission module 114a, and an ultrasonic reception module 114b, for example. In addition, the conveyance path in the image reading apparatus 100 is also provided with a first conveyance roller 115, a first driven roller 116, a second document detector 117, a first image generator 118a, a second image generator 118b, a second conveyance roller 119, and the second driven roller 120, for example.

The top face of the housing 101 forms a lower guide 101a of the path for conveying a document, and the bottom face of the top part 102 forms an upper guide 102a of the document-conveyance path. An arrow A3 in FIG. 3 indicates the direction of conveying a document. In the following, "upstream" indicates upstream in the document-conveyance direction A3, while "downstream" indicates downstream in the document-conveyance direction A3.

The first document detector 110 includes a contact detection sensor, which is disposed upstream from the feed roller 111 and the retard roller 112, and detects whether or not a document is placed on the document tray 103. The first document detector 110 generates and outputs a first document-detection signal having a different signal value depending on whether or not a document is placed on the document tray 103.

The infrared irradiation module 113a and the infrared reception module 113b are disposed in a position that is near and above the document-conveyance path. The infrared irradiation module 113a irradiates a front side of the document being conveyed, with infrared rays. Specifically, the infrared irradiation module 113a irradiates the front side with infrared rays in an oblique direction with respect to the document-conveyance direction A3. The infrared reception module 113b receives infrared rays reflected from the document, and generates and outputs an infrared signal that is an electric signal representing the intensity of the received infrared rays. In the following, the infrared irradiation module 113a and the infrared reception module 113b are collectively referred to as an infrared sensor 113, in some parts.

The ultrasonic transmission module 114a and the ultrasonic reception module 114b are disposed near the document-conveyance path to face each other while having the conveyance path therebetween. The ultrasonic transmission module 114a transmits ultrasonic waves. The ultrasonic reception module 114b receives ultrasonic waves that are transmitted by the ultrasonic transmission module 114a and thereafter passed the document, and then generates and outputs an ultrasonic signal that is an electric signal representing the intensity of the received ultrasonic waves. In the following, the ultrasonic transmission module 114a and the ultrasonic reception module 114b are collectively referred to as an ultrasonic sensor 114 in some parts.

The second document detector 117 includes a contact detection sensor, which is disposed upstream from the first image generator 118a and the second image generator 118b, and detects whether or not a document is present upstream from the first image generator 118a and the second image generator 118b. The second document detector 117 generates and outputs a second document-detection signal having a different signal value depending on whether or not a document is present upstream from the first image generator 118a and the second image generator 118b.

The first image generator 118a includes an imaging sensor for capturing an image of an imaging target such as a document. The imaging sensor includes imaging devices, which have one-dimensionally or two-dimensionally aligned complementary metal oxide semiconductors (CMOSs), and an optical system, which forms an image of the imaging target on the imaging devices. Each of the imaging devices reads information from the back side of the document, and outputs an analog value corresponding to each of red, green, and blue (RGB) colors. The first image generator 118a generates a pixel data piece by converting each of the analog values output by the imaging sensor, to a digital value, and thereby generates image data having the generated pixel data pieces (hereinafter referred to as an RGB image). The RGB image is color image data including image data pieces each having 24-bit RGB values in total where each of the RGB colors is expressed by 8 bits, for example. The first image generator 118a generates and outputs an image (hereinafter referred to as an input image) by converting the RGB values of each of the pixels of the RGB image to a luminance value and color difference values (YUV values). The YUV values are calculated by using the following equations, for example.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

Similarly, the second image generator 118b includes an imaging sensor for taking an image of an imaging target such as a document. The imaging sensor includes imaging devices, which have one-dimensionally or two-dimensionally aligned CMOSs, and an optical system, which forms an image of the imaging target on the imaging devices. Each of the imaging devices reads information from the front side of the document, and outputs an analog value corresponding to each of RGB colors. The second image generator 118b generates a pixel data piece by converting each of the analog values, output by the imaging sensor, to a digital value, and thereby generates an RGB image. The second image generator 118b generates and outputs an input image by converting the RGB values of each of the pixels of the RGB image to YUV values.

Only one of the first image generator 118a and the second image generator 118b may be provided to read only one side of the document. Moreover, instead of CMOSs, charge coupled devices (CCDs) may be used for imaging devices. In the following, the first image generator 118a and the second image generator 118b are collectively referred to as an image generator 118 in some parts.

The document placed on the document tray 103 is conveyed in the document-conveyance direction A3 between the lower guide 101a and the upper guide 102a when the feed roller 111 rotates in the direction indicated by an arrow A4 in FIG. 3. The retard roller 112 rotates in the direction indicated by an arrow A5 in FIG. 3, when the document is being conveyed. When two or more documents are placed on the document tray 103, only the one that is directly in contact with the feed roller 111 among the documents placed on the document tray 103 is separated by the operation of the feed roller 111 and the retard roller 112. This prevents the documents, other than the one thus separated, from being conveyed (prevention of multi feed). The feed roller 111 and the retard roller 112 function as a document separator.

The document is fed to the position between the first conveyance roller 115 and the first driven roller 116 while being guided by the lower guide 101a and the upper guide 102a. The document is further fed to the position between the first image generator 118a and the second image generator 118b when the first conveyance roller 115 rotates in the direction indicated by an arrow A6 in FIG. 3. The document read by the image generator 118 is discharged onto the front cover 105 when the second conveyance roller 119 rotates in the direction indicated by an arrow A7 in FIG. 3.

Figure 4:
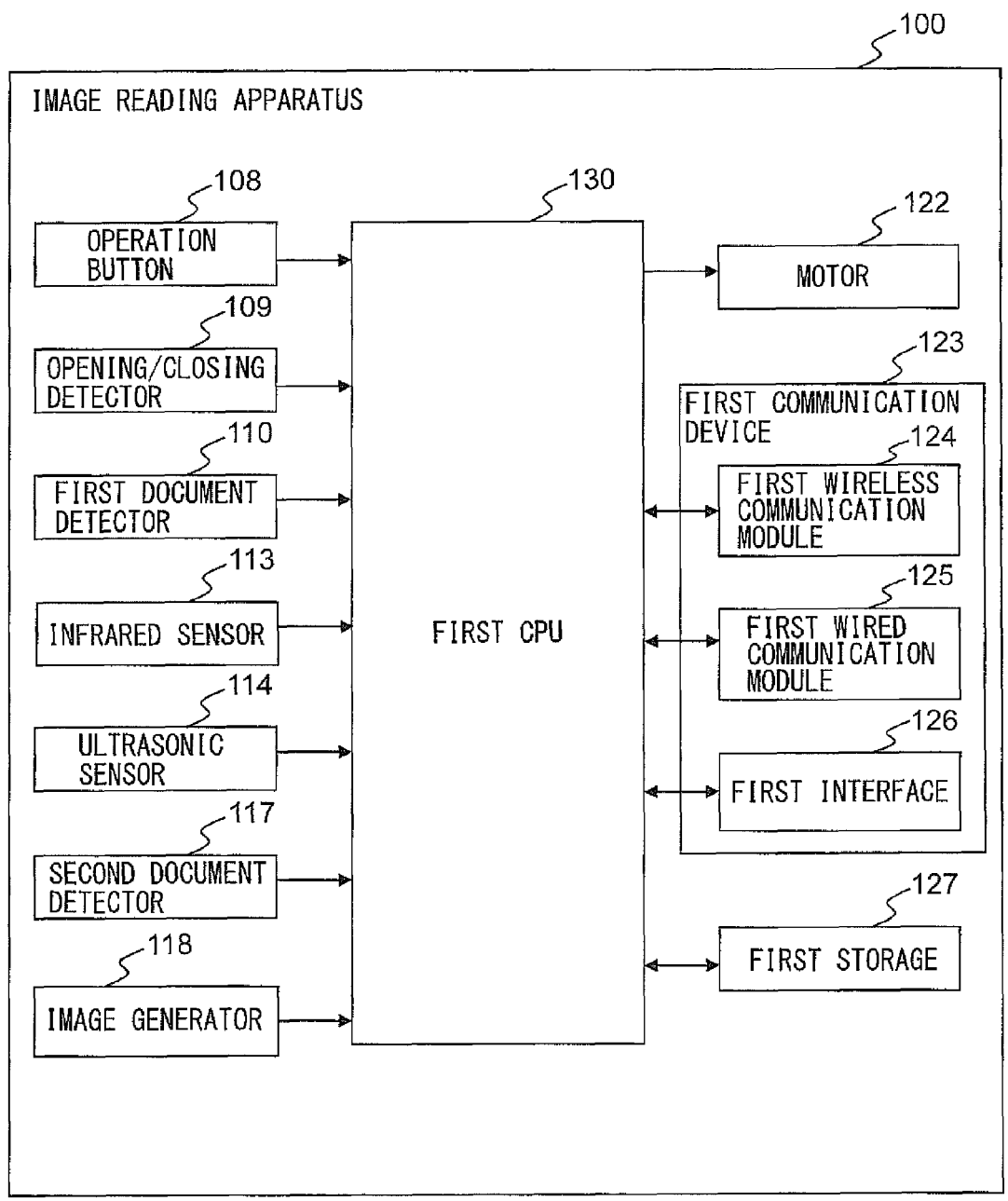
FIG. 4 is a diagram illustrating an example of a schematic configuration of the image reading apparatus 100.

FIG. 4 is a diagram illustrating an example of a schematic configuration of the image reading apparatus 100.

In addition, the above-described configuration, the image reading apparatus 100 further includes a motor 122, a first communication device 123, a first storage 127, and a first CPU 130, and the like.

The motor 122 carries out a document-conveyance operation by causing the feed roller 111, the retard roller 112, the first conveyance roller 115, and the second conveyance roller 119, to rotate in response to a control signal from the first CPU 130.

The first communication device 123 includes a first wireless communication module 124, a first wired communication module 125, and a first interface 126. The first communication device 123 communicates with one of the first information processing apparatus 200, the second information processing apparatus 300, and the third information processing apparatus 400, according to a corresponding one of multiple communication types.

The first wireless communication module 124 includes an antenna for transmitting and receiving a radio signal, and a wireless communication interface circuit for transmitting and receiving a signal via a wireless communication network according to a wireless communication standard such as IEEE 802.11. The first wireless communication module 124 transmits and receives various images and information by being connected to the first information processing apparatus 200 via the access point 500. However, the first wireless communication module 124 may communicate directly with the first information processing apparatus 200 instead of communicating via the access point 500.

The first wired communication module 125 includes a wired communication interface circuit for transmitting and receiving a signal via a wired communication network such as a wired LAN according to a communication standard such as Ethernet (registered trademark). The first wired communication module 125 transmits and receives various images and information by being connected to the second information processing apparatus 300.

The first interface 126 includes an interface circuit for transmitting and receiving a signal according to a serial bus standard such as Universal Serial Bus (USB) 1.1, 2.0, or 3.0, for example. The first interface 126 transmits and receives various images and information by being electrically connected to the third information processing apparatus 400.

Note that the image reading apparatus 100 transmits and receives images and information only to and from one of the information processing apparatuses only via the corresponding one of the first wireless communication module 124, the first wired communication module 125, and the first interface 126, at a time. When two or more of the first wireless communication module 124, the first wired communication module 125, and the first interface 126 are each connected to the corresponding one of the information processing apparatuses, priority is given to communication with the first interface 126, communication with the first wired communication module 125, and communication with the first wireless communication module 124, in this order.

The first storage 127 includes a memory such as a random access memory (RAM) or a read only memory (ROM), a fixed disk such as a hard disk, or a portable storage such as a flexible disk or an optical disk, for example. The first storage 127 stores computer programs, databases, tables and the like to be used in various processes carried out by the image reading apparatus 100. The computer program may be installed on the first storage 127 from a computer-readable, non-transitory medium such as a compact disk read only memory (CD-ROM), a digital versatile disk read only memory (DVD-ROM), or the like by using a well-known setup program or the like. In addition, the first storage 127 also stores image data generated from the document.

The first CPU 130 operates based on a program stored in the first storage 127 in advance. The first CPU 130 is connected to the operation button 108, the opening/closing detector 109, the first document detector 110, the infrared sensor 113, the ultrasonic sensor 114, the second document detector 117, the image generator 118, the motor 122, the first communication device 123, and the first storage 127. The first CPU 130 controls these components. The first CPU 130 performs drive control of the motor 122, and image generation control of the image generator 118, for example. Moreover, the first CPU 130 carries out a compression process by determining a compression ratio to be used for compressing a generated image, and then notifies a corresponding one of the first information processing apparatus 200, the second information processing apparatus 300, and the third information processing apparatus 400, of the compressed image data via the first communication device 123.

Figure 5:
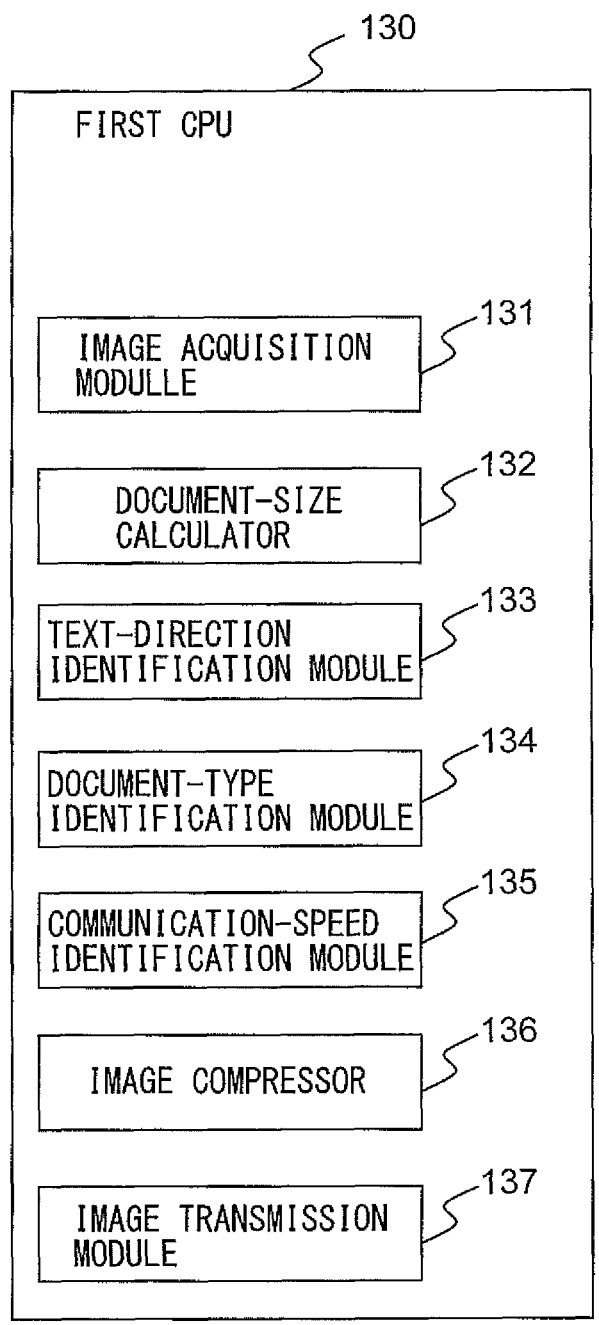
FIG. 5 is a diagram illustrating an example of a schematic configuration of a first central processing unit (CPU) 130.

FIG. 5 is a diagram illustrating an example of a schematic configuration of the first CPU 130.

As illustrated in FIG. 5, the first CPU 130 includes an image acquisition module 131, a document-size calculator 132, a text-direction identification module 133, a document-type identification module 134, a communication-speed identification module 135, an image compressor 136, and an image transmission module 137. These units are function modules implemented by software operating on the processor. Alternatively, the units may each be configured of an independent integrated circuit, microprocessor, firmware, or the like.

Figure 6:
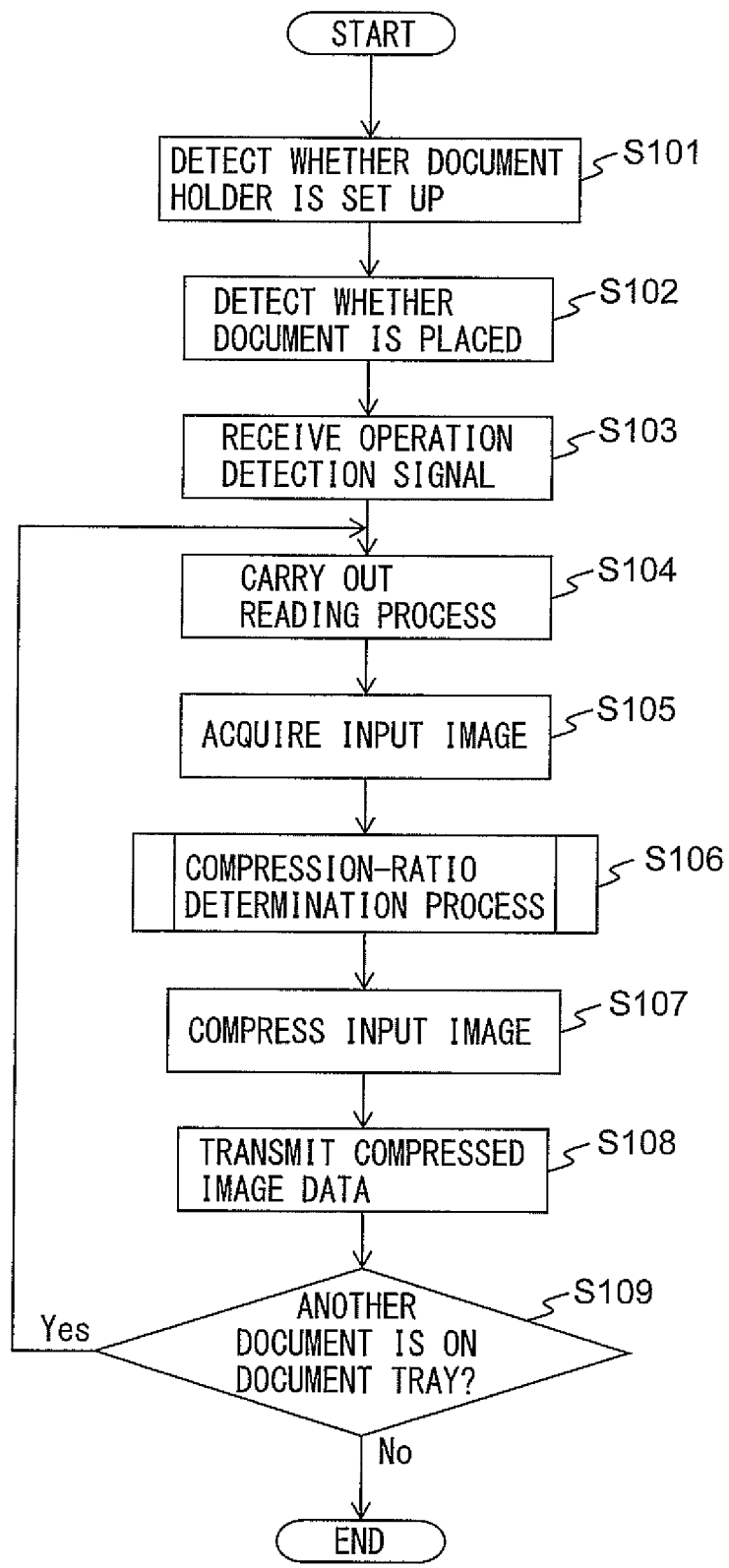
FIG. 6 is a flowchart illustrating an example of operations in an image reading process.

FIG. 6 is a flowchart illustrating an example of operations in an image reading process by the image reading apparatus 100. In the following, the example of the operations in the image reading process will be described with reference to the flowchart in FIG. 6. Note that the flow of the operations described below is carried out mainly by the first CPU 130 in cooperation with other components of the image reading apparatus 100, based on a program stored in the first storage 127 in advance.

First, the image acquisition module 131 monitors the opened/close state of the document tray 103 based on opening/closing detection signals received from the opening/closing detector 109, and stays in a stand-by state until detecting that the document tray 103 is opened and set up (Step S101).

The image acquisition module 131 monitors whether or not a document is placed on the document tray 103, based on the first document-detection signal received from the first document detector 110, and stays in a stand-by state until detecting that a document is placed (Step S102).

The image acquisition module 131 stays in a stand-by state until receiving an operation detection signal from the operation button 108 when pressing of the operation button 108 by a user (Step S103).

When receiving an operation detection signal from the operation button 108, the image acquisition module 131 causes the motor 122 to drive to convey the document as described above, and also causes the image generator 118 to read the document (Step S104).

When the image generator 118 completes the reading of the document, the image acquisition module 131 acquires an input image output by the image generator 118 (Step S105).

The first CPU 130 carries out a compression-ratio determination process (step S106). In the compression-ratio determination process, the document-type identification module 134 identifies the type of the document, and the image compressor 136 determines a compression ratio to be used for compressing the input image, based on the type of the document. Details of the compression-ratio determination process will be described later.

The image compressor 136 compresses the input image by using the compression ratio determined in the compression-ratio determination process (Step S107). The image compressor 136 compresses the input image according to an encoding method such as Joint Photographic Experts Group (JPEG), and thereby generates compressed image data. The image compressor 136 deletes the input image after generating the compressed image data.

The image transmission module 137 transmits the compressed image data to a corresponding one of the first information processing apparatus 200, the second information processing apparatus 300, and the third information processing apparatus 400 (Step S108).

When the first wireless communication module 124 is connected to the first information processing apparatus 200, the image transmission module 137 transmits the compressed image data to the first information processing apparatus 200 via the first wireless communication module 124. When the first wired communication module 125 is connected to the second information processing apparatus 300, the image transmission module 137 transmits the compressed image data to the second information processing apparatus 300 via the first wired communication module 125. When the first interface 126 is connected to the third information processing apparatus 400, the image transmission module 137 transmits the compressed image data to the third information processing apparatus 400 via the first interface 126. The image transmission module 137 deletes the compressed image data after transmitting the compressed image data.

The image acquisition module 131 determines whether or not another document is on the document tray 103, based on a first document-detection signal received from the first document detector 110 (Step S109).

When another document is on the document tray 103, the image acquisition module 131 returns to Step S104 in the process, and repeats Steps S104 to S108 of the process. On the other hand, when no document is on the document tray 103, the image acquisition module 131 terminates the process.

Figure 7:
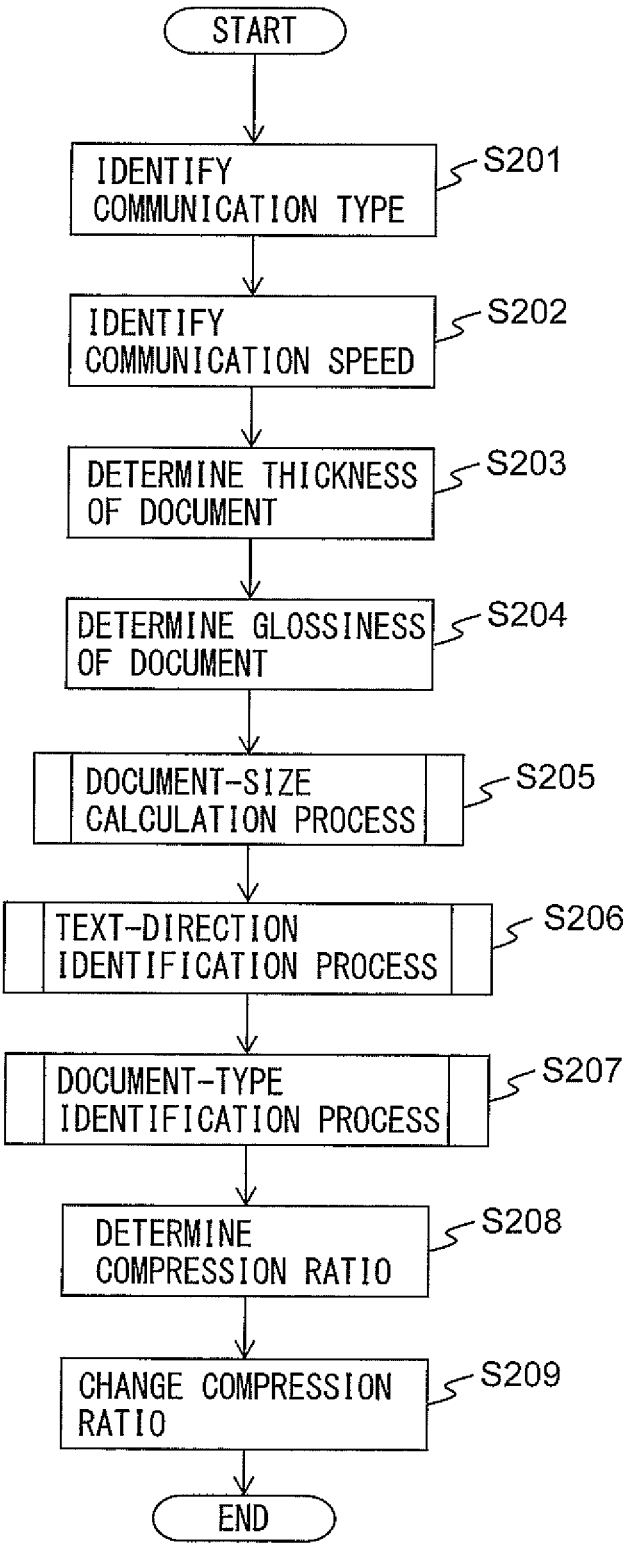
FIG. 7 is a flowchart illustrating an example of operations in a compression-ratio determination process.

FIG. 7 is a flowchart illustrating an example of operations in the compression-ratio determination process. The flow of the operations illustrated in FIG. 7 is carried out in Step S106 in the flowchart illustrated in FIG. 6.

First, the communication-speed identification module 135 identifies the type of communication used by the first communication device 123 for the communication with a corresponding one of the first information processing apparatus 200, the second information processing apparatus 300, and the third information processing apparatus 400 (Step S201).

The communication-speed identification module 135 identifies the type of communication based on the module via which the communication-speed identification module 135 received the newest signal transmitted from the corresponding information processing apparatus, among the first wireless communication module 124, the first wired communication module 125, and the first interface 126. When the newest signal is received via the first wireless communication module 124, the communication-speed identification module 135 determines that the used communication type is wireless LAN communication. When the newest signal is received via the first wired communication module 125, the communication-speed identification module 135 determines that the used communication type is wired LAN communication. When the newest signal is received via the first interface 126, the communication-speed identification module 135 determines that the used communication type is USB communication.

The communication-speed identification module 135 identifies the speed of the communication between the first communication device 123 and the corresponding one of the first information processing apparatus 200, the second information processing apparatus 300, and the third information processing apparatus 400 (Step S202).

When determining that the used communication type is wireless LAN communication, the communication-speed identification module 135 acquires information indicating the current radio field intensity from the first wireless communication module 124. The communication-speed identification module 135 identifies the communication speed as low speed when the radio field intensity is −60 dBm or lower (low), while identifying as high speed when the radio field intensity is higher than −60 dBm (high). When determining that the used communication type is wired LAN communication, the communication-speed identification module 135 acquires information indicating whether the used type of connection is 10 BASE, 100 BASE, or 1000 BASE, from the first wired communication module 125. The communication-speed identification module 135 identifies the communication speed as medium speed when the connection type is 10 BASE, otherwise identifies as high speed. When determining that the communication type is USB communication, the communication-speed identification module 135 identifies the communication speed as high speed.

Note that the communication-speed identification module 135 may identify the communication speed when the image reading apparatus 100 is started, instead of identifying the communication speed in real time, and then store the communication speed in the first storage 127.

The document-type identification module 134 determines whether or not the thickness of the document being conveyed is equal to or larger than a predetermined thickness, based on an ultrasonic signal output by the ultrasonic sensor 114 (Step S203). The predetermined thickness is set at a value (e.g., 0.15 mm) such that a general plastic card (such as a credit card, a cash card, or a telephone card) and a general business card can be distinguished from each other.

The document-type identification module 134 acquires an ultrasonic signal from the ultrasonic sensor 114, and determines whether or not the acquired ultrasonic signal has a signal value that is equal to or larger than a first predetermined value. The document-type identification module 134 determines that the thickness of the document is smaller than the predetermined thickness when the signal value of the ultrasonic signal is equal to or larger than the first predetermined value, while determining that the thickness of the document is equal to or larger than the predetermined thickness when the signal value of the ultrasonic signal is smaller than the first predetermined value. The first predetermined value is set at the signal value of the ultrasonic signal based on ultrasonic waves passing a document having the predetermined thickness, according to a prior experiment.

The document-type identification module 134 determines whether or not the document being conveyed is glossy, based on an infrared signal output by the infrared sensor 113 (Step S204).

The document-type identification module 134 acquires an infrared signal from the infrared sensor 113, and determines whether or not the signal value of the acquired infrared signal is equal to or larger than a second predetermined value. The document-type identification module 134 determines that the document is glossy when the signal value of the infrared signal is equal to or larger than the second predetermined value, while determining that the document is not glossy when the signal value of the infrared signal is smaller than the second predetermined value. The second predetermined value is set at the mean value of the average value of the signal values of infrared signals based on infrared rays reflected from several kinds of plastic cards and the average value of the signal values of infrared signals based on infrared rays reflected from several kinds of business cards, according to a prior experiment.

The document-size calculator 132 carries out a document-size calculation process (Step S205). In the document-size calculation process, the document-size calculator 132 calculates the size of the document based on the input image and second document-detection signals. Details of the document-size calculation process will be described later.

The text-direction identification module 133 carries out a text-direction identification process (Step S206). In the text-direction identification process, the text-direction identification module 133 identifies the text direction in which printed characters are aligned on the document, based on the input image. Details of the text-direction identification process will be described later.

The document-type identification module 134 carries out a document-type identification process (Step S207). In the document-type identification process, the document-type identification module 134 identifies the type of the document based on the size, thickness, glossiness, and text direction of the document. The document-type identification module 134 identifies the type of the document from among a business card, a receipt, and a plastic card. In addition, when the type of the document is not one of the above, the document-type identification module 134 identifies the type of the document from among a sheet that is equal to or larger than A5 size such as plain paper copier (PPC) sheet (referred to as large sheet) and sheet that is smaller than A5 size (referred to as small sheet). Details of the document-type identification process will be described later.

The image compressor 136 determines a compression ratio to be used for compressing the input image, based on the type of document identified by the document-type identification module 134 (Step S208).

The image compressor 136 determines the compression ratio to be one of seven predetermined compression ratios A to G. Among the compression ratios A to G, the compression ratio A is the lowest (high image quality compression), the compression ratio increases from the compression ratios B, C, D, E, to F in this order, and the compression ratio G is the highest (low image quality compression).

When the type of the document is small sheet, the image compressor 136 determines the compression ratio to be the compression ratio B so that the input image would be compressed to have as high image quality as possible, since the pint on the document is likely to be unclear. When the type of the document is a business card, it is highly likely that the optical character recognition (OCR) process is to be applied to the image, and that the image is for business use. Accordingly, the image compressor 136 determines the compression ratio to be the compression ratio C, which is the next lowest after the compression ratio B. When the type of the document is receipt, it is highly likely that the OCR process and the like is to be applied to the image, and that the image is to be for private use. Accordingly, the image compressor 136 determines the compression ratio to be the compression ratio D, which is higher than the compression ratio C. When the type of the document is plastic card, it is highly likely that the image quality of the input image itself is poor in the first place since a plastic card is glossy, and therefore reflects light. Accordingly, the image compressor 136 determines the compression ratio to be the compression ratio E, which is higher than the compression ratio D. When the type of the document is large sheet, the image compressor 136 determines the compression ratio to be the compression ratio F, which is higher than the compression ratio E, so that the amount of compressed image data not transmitted yet would not exceed the storage capacity of the first storage 127. In this way, the image compressor 136 is able to determine a compression ratio such that the image quality and the amount of compressed image data would be appropriate, according to the type of the document.

The image compressor 136 changes the compression ratio based on the communication speed identified by the communication-speed identification module 135 (Step S209), and thereafter terminates the process.

The image compressor 136 changes the compression ratio determined in Step S208 one level lower when the communication speed is high, changes the compression ratio one level higher when the communication speed is low, and does not change the compression ratio when the communication speed is medium. For example, the compression ratio for the document whose type is large sheet, is changed to the compression ratio E when the communication speed is high, remains at the compression ratio F when the communication speed is medium, and is changed to the compression ratio G when the communication speed is low. In this way, the image compressor 136 is able to change the amount of compressed image data appropriately, according to the speed of communication between the corresponding information processing apparatus and the image reading apparatus 100.

Note that, in Step S202, the communication-speed identification module 135 may identify the communication speed only based on the type of communication used to communicate with a corresponding one of the first information processing apparatus 200, the second information processing apparatus 300, and the third information processing apparatus 400. In this case, the communication-speed identification module 135 identifies the communication speed as high speed when the communication is based on USB or wired LAN, while identifying the communication speed as low speed when the communication is based on wireless LAN. In such a case, in Step S208, the image compressor 136 changes the compression ratio to be used for compressing the input image, based on the type of communication used to communicate with the corresponding one of the first information processing apparatus 200, the second information processing apparatus 300, and the third information processing apparatus 400.

Alternatively, the image compressor 136 may determine the compression ratio only based on the type of the document without considering the communication speed, by omitting the operation in Step S209.

Figure 8:
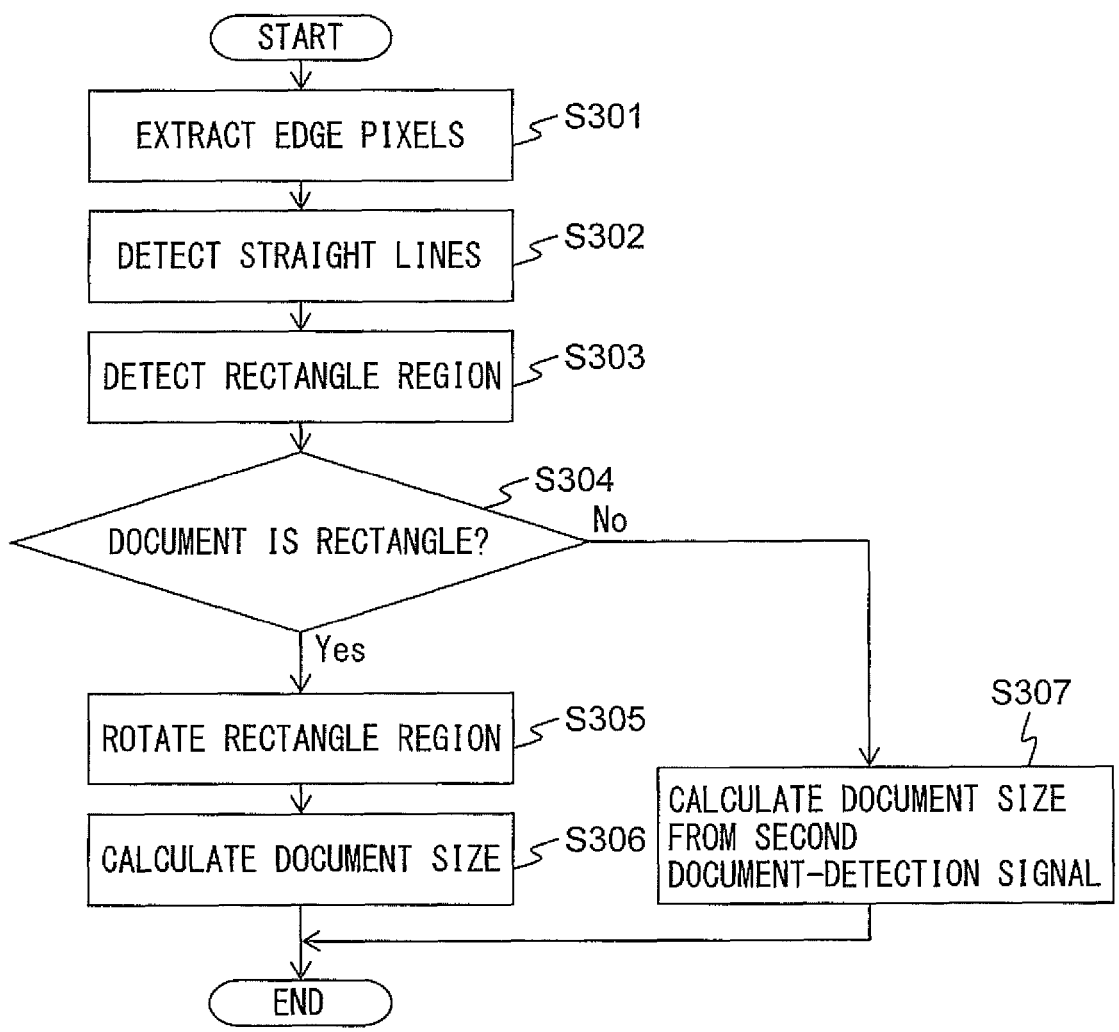
FIG. 8 is a flowchart illustrating an example of operations in a document-size calculation process.

FIG. 8 is a flowchart illustrating an example of operations in the document-size calculation process. The flow of the operations in FIG. 8 is carried out in Step S205 in the flowchart in FIG. 7.

First, the document-size calculator 132 extracts horizontal and vertical edge pixels from the input image output by the image generator 118 (Step S301).

The document-size calculator 132 calculates the absolute value of the difference in luminance value between each two pixels in the input image that are horizontally adjacent to each other (referred to as an adjacent difference value below), and determines the pixels in the image as vertical edge pixels when the adjacent difference value exceeds a threshold value Th1. The threshold value Th1 may be set at a value corresponding to such a difference in luminance value that people can recognize the difference in luminance by looking at the image (e.g., 15), for example. In addition, the document-size calculator 132 performs a similar process vertically on each two pixels to extract horizontal edge pixels.

The document-size calculator 132 detects multiple straight lines from each of the edge image generated from the respective horizontal edge pixels (hereinafter referred to as a horizontal edge image) and the edge image generated from the respective vertical edge pixels (hereinafter referred to as a vertical edge image) (Step S302). In this step, horizontal straight lines are detected from the horizontal edge image, and vertical straight lines are detected from the vertical edge image.

The document-size calculator 132 detects straight lines by using Hough transform. Alternatively, the document-size calculator 132 may detect straight lines by using least-squares method.

The document-size calculator 132 detects a rectangle region formed by the detected straight lines (Step S303).

The document-size calculator 132 extracts multiple rectangle region candidates each formed by four straight lines among the multiple detected straight lines, each two of the four straight lines being substantially orthogonal to each other. First of all, the document-size calculator 132 selects a straight line (hereinafter referred to as a first horizontal line) from the horizontal straight lines, and then extracts a horizontal straight line (hereinafter referred to as a second horizontal line) that is substantially parallel with the first horizontal line thus selected (e.g., ±3° or smaller) and is away from the first horizontal line by a threshold value Th4 or more. Thereafter, the document-size calculator 132 extracts a vertical straight line (hereinafter referred to as a first vertical line) that is substantially orthogonal to the first horizontal line (e.g., 90°±3° or smaller). The document-size calculator 132 extracts a vertical line (hereinafter referred to as a second vertical line) that is substantially orthogonal to the first horizontal line and is away from the first vertical line by a threshold value Th5 or more. The threshold value Th4 and the threshold value Th5 are set in advance according to the size of the document to be read by the image reading apparatus 100, and may be set at the same value.

The document-size calculator 132 extracts all of the combinations of the first horizontal line, the second horizontal line, the first vertical line, and the second vertical line that satisfy the above condition, from among all the detected straight lines, and then extracts the rectangle region formed by each of the extracted combinations, as a rectangle region candidate. The document-size calculator 132 calculates the area of each of the extracted rectangle region candidates, and detects the rectangle region candidate having the largest area, as the rectangle region.

The document-size calculator 132 determines whether or not the document is a rectangle (Step S304). The document-size calculator 132 determines that the document is a rectangle when extracting at least one rectangle region candidate and detecting a rectangle region, while determining that the document is not a rectangle when extracting no rectangle region candidate.

When determining that the document is a rectangle, the document-size calculator 132 rotates the detected rectangle region so that each of the four sides of the rectangle region would be substantially parallel to the corresponding one of the four sides of the input image (Step S305).

Figure 9:
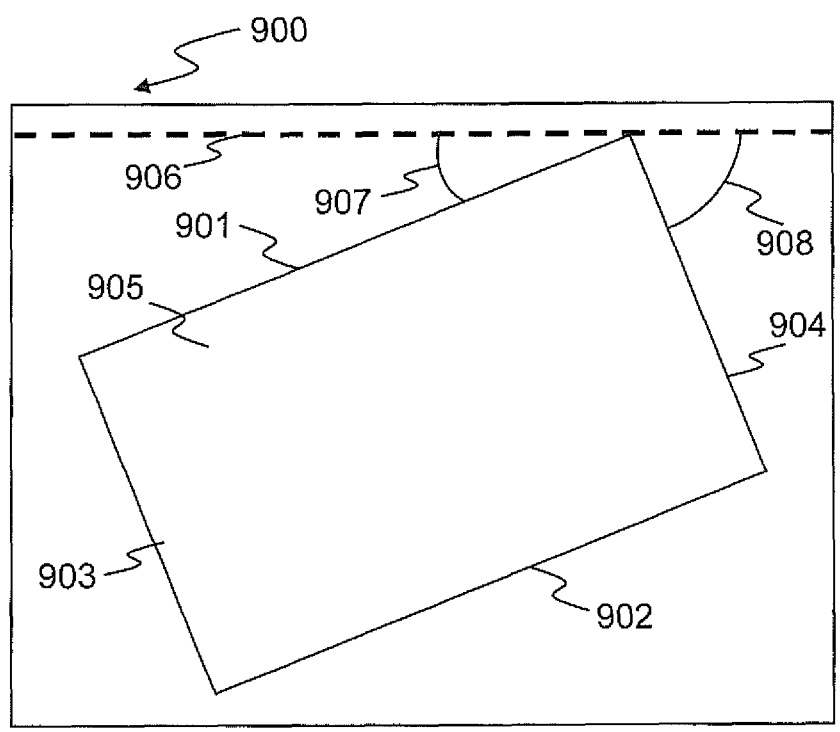
FIG. 9 is an exemplary diagram illustrating rotation of a rectangle region.

FIG. 9 is a schematic view for illustrating the rotation of a rectangle region.

In an input image 900 in FIG. 9, a rectangle region 905 formed by a first horizontal line 901, a second horizontal line 902, a first vertical line 903, and a second vertical line 904 is detected. The document-size calculator 132 calculates an angle 907 between the first horizontal line 901, which is the one positioned closer to an upper edge portion of the input image 900 of the two horizontal lines, and a horizontal line 906, which is parallel to the upper edge portion of the input image 900. Similarly, the document-size calculator 132 calculates an angle 908 between the second vertical line 904, which is the one positioned closer to the upper edge portion of the input image 900 of the two vertical lines, and the horizontal line 906. When the angle 907 is equal to or smaller than the angle 908, the document-size calculator 132 rotates the rectangle region 905 so that the first horizontal line 901 would be parallel to the horizontal line 906 (i.e., the angle 907 would be 0°). On the other hand, when the angle 907 is larger than the angle 908, the document-size calculator 132 rotates the rectangle region 905 so that the second vertical line 904 would be parallel to the horizontal line 906 (i.e., the angle 908 would be 0°).

The document-size calculator 132 calculates the longitudinal size and the short-length size of the document from the number of dots in the longitudinal direction and the number of dots in the short-length direction of the detected rectangle region, and the dots per inch (dpi) at the time when the document is read (Step S306). After calculating each of the sizes, the document-size calculator 132 terminates the process.

In contrast, when determining that the document is not a rectangle in Step S304, the document-size calculator 132 calculates the size of the document based on second detection signals received from the second document detector 117 (Step S307), and thereafter terminates the process.

The image reading apparatus 100 stores in advance, in the first storage 127, the travel distance of a circumferential part of the first conveyance roller 115 at the time when the motor 122 is driven for one pulse. The document-size calculator 132 calculates, as the document size in the document-conveyance direction, the value obtained by multiplying the travel distance by the number of pulses for which the motor 122 is driven while each second document-detection signal indicates that the document is present. Assuming that the travel distance of the circumference part of the first conveyance roller 115 at the time when the motor 122 is driven for one pulse is 0.04 mm, and that the number of pulses for which the motor 122 is driven while each second document detection signal indicates that the document is present is 4000. In this condition, the document size is calculated as 160 mm. In this case, the document-size calculator 132 does not calculate the document size in the direction orthogonal to the document-conveyance direction.

Figure 10:
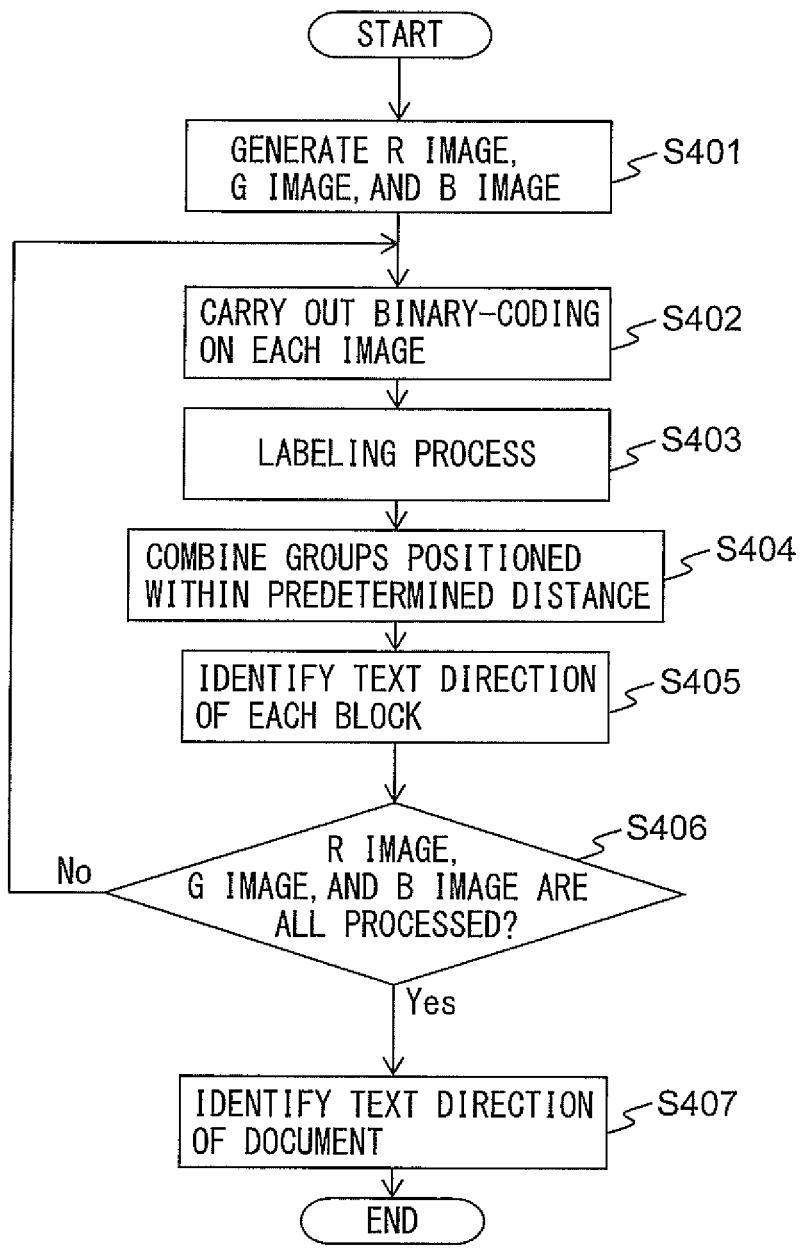
FIG. 10 is a flowchart illustrating an example of operations in a text-direction identification process.

FIG. 10 is a flowchart illustrating an example of operations in the text-direction identification process. The flow of the operations in FIG. 10 is carried out in Step S206 in the flowchart in FIG. 7.

First, the text-direction identification module 133 reconverts the YUV values of the input image to respective RGB values, and generates an R image, in which the data on each pixel is composed of an R value, a G image, in which the data on each pixel is composed of a G value, and a B image, in which the data on each pixel is composed of a B value (Step S401). The RGB values are able to be calculated by using the following equations, for example.

$$R\ \text{value} = 1.000 \times Y\ \text{value} + 1.402 \times V\ \text{value} \quad (4)$$

$$G\ \text{value} = 1.000 \times Y\ \text{value} - 0.344 \times U\ \text{value} - 0.714 \times V\ \text{value} \quad (5)$$

$$B\ \text{value} = 1.000 \times Y\ \text{value} + 1.772 \times U\ \text{value} \quad (6)$$

The process in Steps S402 to S405 is performed on each of the R image, the G image, and the B image. In Steps S402 to S405, each image subjected to the process is referred to as a processing image.

The text-direction identification module 133 performs a binary coding process on each processing image by using a binary-coding threshold value, and generates a binary-coded image, in which each pixel having a value equal to or larger than the binary-coding threshold value is converted to a black pixel while each pixel having a value smaller than the binary-coding threshold value is converted to a white pixel (Step S402). The binary-coding threshold value may be set at a predetermined value (e.g., 128) or the average value of all the pixel values of the processing image, for example.

The text-direction identification module 133 determines whether or not each black pixel in the binary-coded image is connected to another black pixel, and labels connected black pixels as a group (Step S403). The text-direction identification module 133 determines that black pixels adjacent to each other horizontally, vertically or diagonally (in eight neighbor directions), are connected black pixels. Alternatively, the text-direction identification module 133 may determine that black pixels adjacent to each other only horizontally or vertically (in four neighbor directions) are connected black pixels.

The text-direction identification module 133 determines whether or not each group is close to another group, and combines groups that are close to each other as a single block (Step S404). The text-direction identification module 133 combines groups that overlap vertically each other and have edge portions positioned horizontally within a predetermined distance from each other, or groups that overlap horizontally each other and have edge portions positioned vertically within a predetermined distance from each other, as a single block.

The text-direction identification module 133 determines whether the text-direction of each block is the longitudinal direction or the short-length direction of the document (Step S405).

The text-direction identification module 133 considers the longitudinal direction of the circumscribed rectangle region of each block as the text direction. The text-direction identification module 133 determines that the text direction is the longitudinal direction of the document when the longitudinal direction of the circumscribed rectangle region of the block corresponds to the longitudinal direction of the binary-coded image. In contrast, the text-direction identification module 133 determines that the text direction is the short-length direction of the document when the longitudinal direction of the circumscribed rectangle region of the block corresponds to the short-length direction of the binary-coded image.

The text-direction identification module 133 determines whether or not the process is completed for all of the R, G, and B images (Step S406). When there are still one or more images that have not been subjected to the process, the process returns to Step S402, and repeats the operations in Steps S402 to S406.

On the other hand, when the process is completed for all of the R, G, and B images, the text-direction identification module 133 determines whether the text direction in which the characters printed on the document are aligned is the longitudinal direction or the short-length direction of the document (Step S407).

The text-direction identification module 133 identifies the longitudinal direction of the document as the text direction of the document when the number of blocks determined to have the longitudinal direction of the document as the text direction is equal to or larger than the number of blocks determined to have the short-length direction of the document as the text direction in the R image, the G image, and the B image. On the other hand, the text-direction identification module 133 identifies the short-length direction of the document as the text direction of the document when the number of blocks determined to have the longitudinal direction of the document as the text direction is smaller than the number of blocks determined to have the short-length direction of the document as the text direction.

Figure 11:
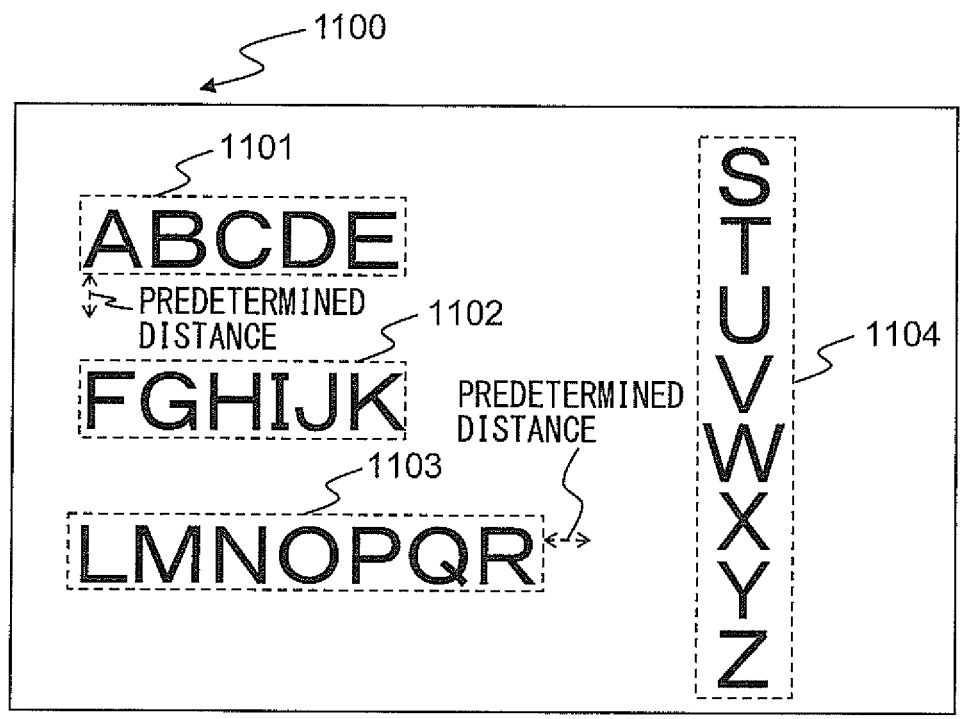
FIG. 11 is an exemplary diagram illustrating the text-direction identification process.

FIG. 11 is a schematic view for illustrating the text-direction identification process.

An image 1100 in FIG. 11 is a binary-coded image. In the binary-coded image 1100, each of the characters A to Z is labeled as a group. The character A group and the character B group overlap vertically while the right edge of the character A group and the left edge of the character B group are positioned horizontally within a predetermined distance from each other. Therefore, the character A group and the character B group are combined. Similarly, each two adjacent groups, i.e., the character B group and the character C group, the character C group and the character D group, and the character D group and the character E group, are combined, and the character A group to the character E group are combined as a single block 1101. Similarly, the character F group to the character K group are combined as a single block 1102, the character L group to the character R group are combined as a single block 1103, and the character S group to the character Z group are combined as a single block 1104. However, the blocks 1101 to 1104, each two of which are horizontally or vertically away from each other by a distance larger than the predetermined distance, are not combined with each other.

Since the longitudinal direction of the circumscribed rectangle region of each of the blocks 1101 to 1103 corresponds to the longitudinal direction of the binary-coded image, the longitudinal direction of the document is identified as the text direction for each of the blocks 1101 to 1103. In contrast, since the longitudinal direction of the circumscribed rectangle region of the block 1104 corresponds to the short-length direction of the binary-coded image, the short-length direction of the document is identified as the text direction for the block 1104. In the binary-coded image 1100, the number of blocks having the longitudinal direction as the text direction is three, i.e., the blocks 1101 to 1103, while the number of blocks having the short-length direction as the text direction is one, i.e., the block 1104. Hence, the longitudinal direction of the document is identified as the text direction of the document.

Figure 12:
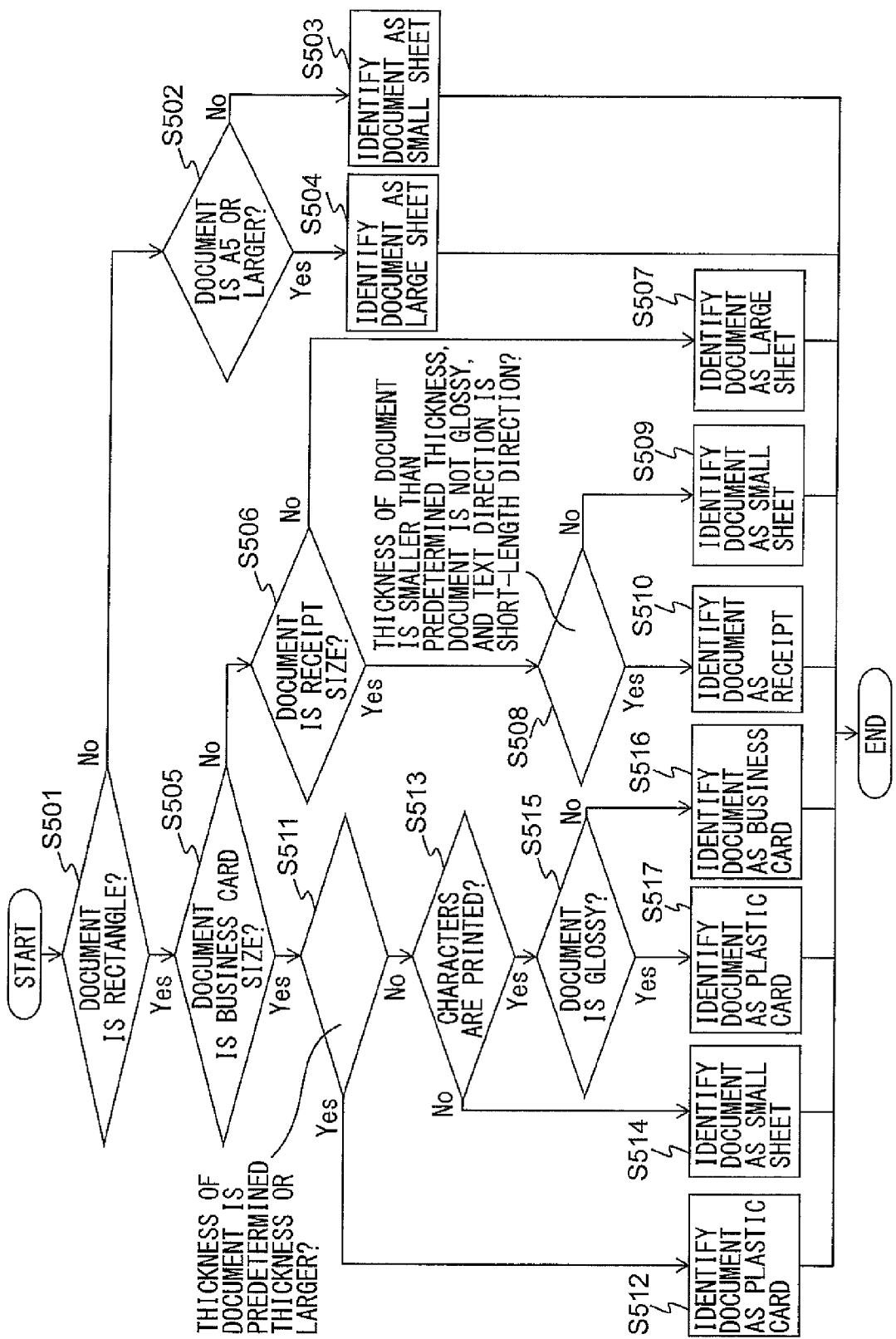
FIG. 12 is a flowchart illustrating an example of operations in a document-type identification process.

FIG. 12 is a flowchart illustrating an example of operations in the document-type identification process. The flow of the operations illustrated in FIG. 12 is carried out in Step S207 in the flowchart in FIG. 7.

First, the document-type identification module 134 determines whether or not the document is determined to be a rectangle in Step S304 in FIG. 8 (Step S501).

When the document is determined not to be a rectangle, the document-type identification module 134 determines whether or not the size of the document in the document-conveyance direction calculated in Step S307 in FIG. 8 is equal to or larger than the longitudinal size (210 mm) of the A5 size (Step S502). The document-type identification module 134 identifies large sheet as the type of the document, when determining that the size of the document is equal to or larger than the longitudinal size of the A5 size (Step S503), and terminates the process. In contrast, when determining that the size of the document is smaller than the longitudinal size of the A5 size, the document-type identification module 134 identifies small sheet as the type of the document (Step S504), and terminates the process. The document-type identification module 134 may identify large sheet as the type of the document when the size of the document is equal to or larger than the short-length size (148 mm) of the A5 size, while identifying small sheet as the type of the document when the size of the document is smaller than the short-length size of the A5 size.

On the other hand, when the document is determined to be a rectangle, the document-type identification module 134 determines whether or not the size of the document calculated in Step S306 in FIG. 8 is the business-card size (Step S505). The document-type identification module 134 determines that the size of the document is the business card size, when determining that the longitudinal size of the document is equal to or smaller than the longitudinal size of a general business card (e.g., 91 mm) and the short-length size of the document is equal to or smaller than the short-length size of a general business card (e.g., 55 mm). In contrast, when determining that the longitudinal size of the document is larger than the longitudinal size of a general business card, or when the short-length size of the document is larger than the short-length size of a general business card, the document-type identification module 134 determines that the size of the document is not the business-card size.

When determining that the size of the document is not the business-card size, the document-type identification module 134 determines whether or not the size of the document is the receipt size, which is larger than the business-card size (Step S506). The document-type identification module 134 determines that the size of the document is the receipt size, when the longitudinal size of the document is equal to or smaller than the maximum value of the longitudinal size assumed for a general receipt and the short-length size of the document is equal to or smaller than the short-length size of a general receipt. The above-mentioned maximum value may be assumed 210 mm, for example, and the short-length size of a general receipt may be assumed 58 mm, for example. In contrast, when the longitudinal size of the document is larger than the maximum value, or when the short-length size of the document is larger than the short-length size of a general receipt, the document-type identification module 134 determines that the size of the document is not the receipt size.

The document-type identification module 134 identifies large sheet as the type of the document when determining that the size of the document is not the receipt size (Step S507), and terminates the process.

On the other hand, when determining that the size of the document is determined to be the receipt size, the document-type identification module 134 determines whether or not the thickness of the document is smaller than a predetermined thickness, whether the document is not glossy, and whether or not the text direction of the document is the short-length direction of the document (Step S508). The document-type identification module 134 determines whether or not the thickness of the document is equal to or larger than the predetermined thickness, based on the determination result in Step S203 in FIG. 7, and determines whether or not the document is glossy, based on the determination result in Step S204. Moreover, the document-type identification module 134 determines whether or not the text direction of the document is the short-length direction of the document, based on the determination result in Step S407 in FIG. 10.

The document-type identification module 134 identifies small sheet as the type of the document when determining that the thickness of the document is equal to or larger than the predetermined thickness, when determining that the document is glossy, or when determining that the text direction of the document is the longitudinal direction of the document (Step S509), and terminates the process. In contrast, when determining that the thickness of the document is smaller than the predetermined thickness, the document is not glossy, and the text direction of the document is the short-length direction of the document, the document-type identification module 134 identifies receipt as the type of the document (Step S510), and terminates the process.

The condition that no characters in black are printed on either the front side or the back side of the document may be added to the above condition for identifying receipt as the type of the document. In this case, the document-type identification module 134 is able to determine that no characters in black are printed when the average value of the luminance values of the respective pixels in the input image is equal to or smaller than a predetermined value (e.g., 15).

On the other hand, when determining that the size of the document is the business-card size in Step S505, the document-type identification module 134 determines whether or not the thickness of the document is equal to or larger than the predetermined thickness (Step S511). The document-type identification module 134 identifies plastic card as the type of the document, when determining that the thickness of the document is equal to or larger than the predetermined thickness (Step S512), and then terminates the process.

On the other hand, when determining that the thickness of the document is smaller than the predetermined thickness, the document-type identification module 134 determines whether or not any character is printed on the document (Step S513).

The document-type identification module 134 determines that one or more characters are printed on the document, when at least one group whose area (the number of pixels) is equal to or larger than a predetermined value is detected by the labeling in Step S403 in FIG. 10. In contrast, when no group whose area (the number of pixels) is equal to or larger than the predetermined value is detected at all, the document-type identification module 134 determines that no characters are printed on the document.

The document-type identification module 134 identifies small sheet as the type of the document when determining that no characters are printed on the document (Step S514), and terminates the process. When determining that one or more characters are printed on the document, the document-type identification module 134 determines whether or not the document is glossy (Step S515). The document-type identification module 134 identifies business card as the type of the document, when determining that the document is not glossy (Step S516), and terminates the process. In contrast, when determining that the document is glossy, the document-type identification module 134 identifies plastic card as the type of the document (Step S517), and terminates the process.

The operations in Steps S501 to S504 may be omitted. In this case, the determination operations in Steps S505 to S517 may be carried out even when the document is not a rectangle. In addition, the operation in Step S513 may be omitted. In this case, the determination operations in Steps S515 to S517 may be carried out even when no characters are printed on the document.

Moreover, the document-type identification module 134 may identify the type of the document only based on the size of the document. In this case, the document-type identification module 134 identifies business card as the type of the document when determining that the size of the document is the business-card size in Step S505. In contrast, when determining that the size of the document is not the business-card size but is the receipt size in Step S506, the document-type identification module 134 identifies receipt as the type of the document. When determining that the size of the document is not the receipt size, either, the document-type identification module 134 identifies small sheet as the type of the document. In this case, the document-type identification module 134 is able to identify the type of the document from among a business card, a receipt, and a small sheet. Alternatively, when determining that the size of the document is business-card size in Step S505, the document-type identification module 134 may identify plastic card as the type of the document. In this case, the document-type identification module 134 is able to identify the type of the document from among plastic card, receipt, and small sheet.

Further, the document-type identification module 134 may identify the type of the document only based on the size and the thickness of the document. In this case, Steps S513 to S515 and S517 are omitted, and the document-type identification module 134 identifies business card as the type of the document when determining that the thickness of the document is smaller than the predetermined thickness in Step S511. In addition, the document-type identification module 134 determines only whether or not the thickness of the document is smaller than the predetermined thickness in Step S508, and identifies receipt as the type of the document when determining that the thickness of the document is smaller than the predetermined thickness, while identifying small sheet as the type of the document when determining that the thickness of the document is equal to or larger than the predetermined thickness.

Furthermore, the document-type identification module 134 may identify the type of the document only based on the size and glossiness of the document. In this case, Steps S511 to S514 are omitted, and the document-type identification module 134 identifies plastic card as the type of the document when determining that the document is glossy in Step S515, while identifying business card as the type of the document when determining that the document is not glossy. In addition, the document-type identification module 134 determines only whether or not the document is glossy in Step S508, and identifies receipt as the type of the document when determining that the document is not glossy while identifying small sheet as the type of the document when determining that the document is glossy.

Further, the document-type identification module 134 may determine only whether or not the text direction of the document is the short-length direction of the document in Step S508, and identifies receipt as the type of the document when determining that the text direction is the short-length direction, while identifying small sheet as the type of the document when determining that the text direction is the longitudinal direction.

Figure 13:
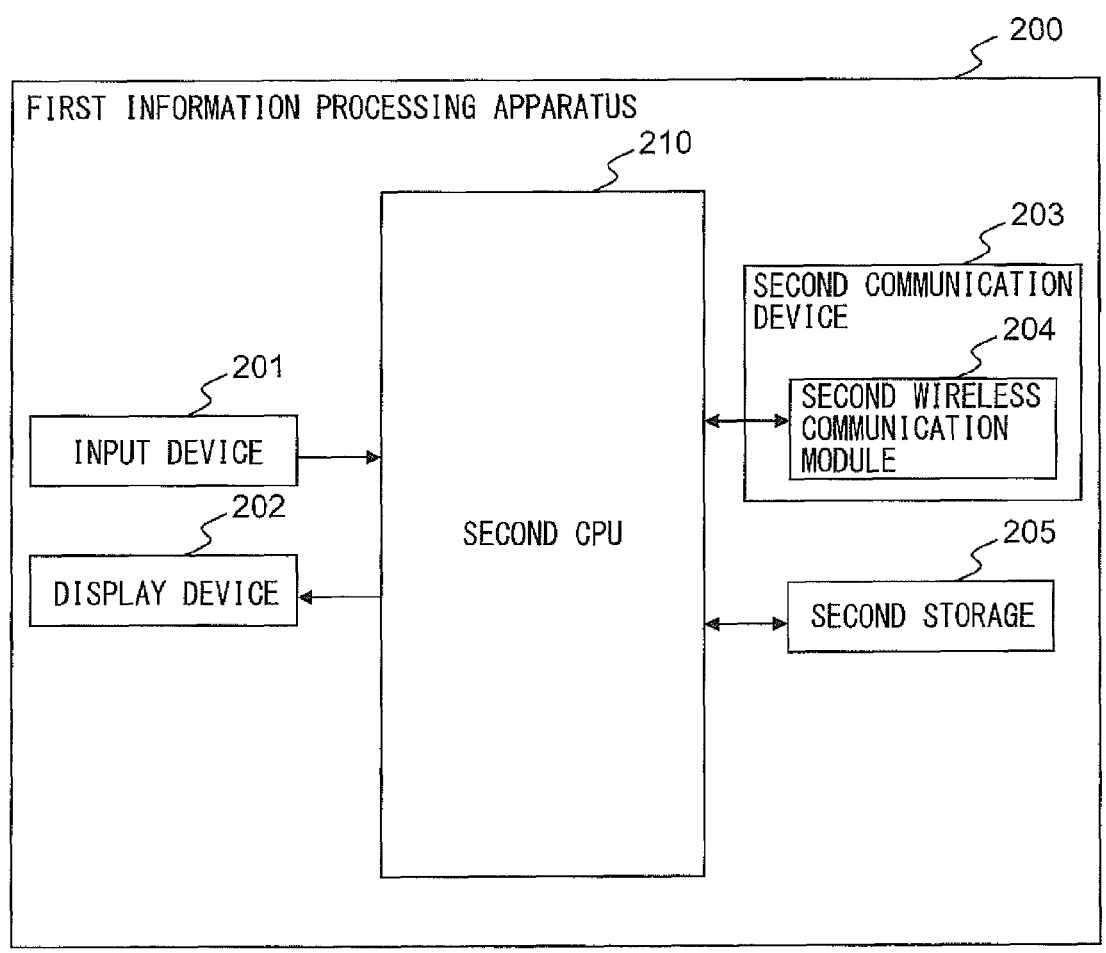
FIG. 13 is a diagram illustrating an example of a schematic configuration of a first information processing apparatus 200 according to another embodiment.

FIG. 13 is a diagram illustrating an example of a schematic configuration of the first information processing apparatus 200 according to another embodiment.

The first information processing apparatus 200 includes an input device 201, a display device 202, a second communication device 203, a second storage 205, and a second CPU 210. In the following, each of the components of the first information processing apparatus 200 will be described in detail.

The input device 201 includes an input unit, such as a keypad, and an interface circuit for acquiring a signal from the input unit, and outputs a signal corresponding to the operation by a user, to the second CPU 210.

The display device 202 includes a display composed of liquid crystals and the like, and an interface circuit for outputting image data and various kinds of information. The display device 202 is connected to the second CPU 210 and displays the information output by the second CPU 210 on the display. Alternatively, the input device 201 and the display device 202 may be integrally provided as a touch-panel display.

The second communication device 203 includes a second wireless communication module 204. The second wireless communication module 204 includes an interface circuit similar to the one in the first wireless communication module 124 in the image reading apparatus 100, and connects the first information processing apparatus 200 with the access point 500.

The second storage 205 includes a memory, a fixed disk or a portable storage, and the like as the first storage 127 in the image reading apparatus 100. The second storage 205 stores computer programs, databases, tables and the like to be used in various processes carried out by the first information processing apparatus 200. The computer program may be installed on the second storage 205 from a computer-readable, non-transitory medium such as a compact disk read only memory (CD-ROM), a digital versatile disk read only memory (DVD-ROM), or the like by using a well-known setup program or the like.

The second CPU 210 operates based on a program stored in the second storage 205 in advance. The second CPU 210 is connected to the input device 201, the display device 202, the second communication device 203, and the second storage 205, and controls these components. The second CPU 210 performs input control of the input device 201, display control of the display device 202, control of data transmission and reception with the image reading apparatus 100 via the second communication device 203, and control of the second storage 205, for example. Moreover, the second CPU 210 decodes compressed image data received from the image reading apparatus 100, and stores the decoded image in the second storage 205. Further, the second CPU 210 displays the decoded image on the display device 202 according to an instruction from a user via the input device 201. These functions are implemented by software operated on the processor.

A schematic configuration of the second information processing apparatus 300 is similar to that of the first information processing apparatus 200. However, a second communication device 203 in the second information processing apparatus 300 includes a second wired communication module instead of the second wireless communication module 204. The second wired communication module includes an interface circuit similar to the one in the first wired communication module 125 in the image reading apparatus 100, and connects the second information processing apparatus 300 with the image reading apparatus 100.

A schematic configuration of the third information processing apparatus 400 is similar to that of the first information processing apparatus 200. However, a second communication device 203 in the third information processing apparatus 400 includes a second interface instead of the second wireless communication module 204. The second interface includes an interface circuit similar to the one in the first interface 126 in the image reading apparatus 100, and connects the third information processing apparatus 400 with the image reading apparatus 100.

As described above in detail, by operating according to the sequence charts in FIG. 6 to FIG. 8, FIG. 10, and FIG. 12, the image reading apparatus 100 is able to determine a compression ratio to be used for compressing an image so that the data amount after compression would be appropriate. This makes it possible to maintain high image quality for a document on which important information is printed, while, for a document in large size, compressing the image so that the data amount after compression would be small.

Moreover, even when reading various document s such as a business card, a plastic card, and a receipt, at the same time, it is possible for the image reading apparatus 100 to make sizes of each piece of the compressed image data to a size equal to or smaller than a certain size. In addition, the image reading apparatus 100 is able to keep the transmitting time within a certain time when transmitting each piece of the compressed image data to a corresponding information processing apparatus. Furthermore, it is possible for the image reading apparatus 100 to keep the time within a certain time when transmitting each piece of compressed image data to a corresponding information processing apparatus, regardless of communication type or communication speed by changing the compression ratio according to the type or speed of communication between the image reading apparatus 100 and the information processing apparatus. These make it possible to suppress the occurrence of interruption of the document-reading process resulting from the storage capacity being exceeded by the amount of the compressed image data that is not transmitted yet.

According to the image reading apparatus and compression-ratio determination method, and the computer-readable, non-transitory medium, it is possible to determine a compression ratio such that the data amount after compression would be optimal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
    an image generator for generating an input image by reading a document;
    a document-type identification module for identifying at least, a business card, a receipt, and a plastic card as a type of the document; and an image compressor for compressing the input image,
wherein the image compressor determines a compression ratio for compressing the input image, based on the type of the document.

2. The image reading apparatus according to claim 1, further comprising:
a document-size calculator for calculating a size of the document;
an ultrasonic sensor for receiving an ultrasonic wave which passes the document; and
an infrared sensor for receiving an infrared ray reflected from the document,
wherein the document-type identification module identifies the type of the document based on the size of the document, an intensity of the ultrasonic wave received by the ultrasonic sensor, and an intensity of the infrared ray received by the infrared sensor.

3. The image reading apparatus according to claim 2, wherein the document-type identification module identifies the plastic card as the type of the document, when the size of the document is equal to or smaller than a first predetermined size, and when the intensity of the ultrasonic wave received by the ultrasonic sensor is lower than a first predetermined value or the intensity of the infrared ray received by the infrared sensor is equal to or higher than a second predetermined value.

4. The image reading apparatus according to claim 2, wherein the document-type identification module identifies the business card as the type of the document, when the size of the document is equal to or smaller than a first predetermined size, and when the intensity of the ultrasonic wave received by the ultrasonic sensor is equal to or higher than a first predetermined value and the intensity of the infrared ray received by the infrared sensor is lower than a second predetermined value.

5. The image reading apparatus according to claim 2, further comprising:
a text-direction identification module for identifying a text direction in which, characters printed on the document are aligned;
wherein the document-type identification module identifies the receipt as the type of the document, when the size of the document is larger than a first predetermined size and equal to or smaller than a second predetermined size which is larger than the first predetermined size, when the intensity of the ultrasonic wave received by the ultrasonic sensor is equal to or higher than a first predetermined value, when the intensity of the infrared ray received by the infrared sensor is lower than a second predetermined value, and when the text direction is a shorter-length direction of the document.

6. The image reading apparatus according to claim 1, wherein the image compressor determines the compression ratio to be a first compression ratio when the type of the document is the business card, determines the compression ratio to be a second compression ratio which is higher than the first compression ratio when the type of the document is the receipt, and determines the compression ratio to be a third compression ratio which is higher than the second compression ratio when the type of the document is the plastic card.

7. The image reading apparatus according to claim 1, further comprising:
a communication module for communicating with an information processing apparatus by using any one of a plurality of communication types;
wherein the image compressor changes the compression ratio based on the communication type used for communicating with the information processing apparatus.

8. The image reading apparatus according to claim 1, further comprising:
a communication module for communicating with an information processing apparatus; and
a communication-speed identification module for identifying a speed of communication between the communication module and the information processing apparatus;
wherein the image compressor changes the compression ratio based on the speed of communication.

9. A compression-ratio determination method performed by a computer, the method comprising:
generating an input image by reading a document;
identifying at least, a business card, a receipt, and a plastic card as a type of the document; and
compressing the input image,
wherein the computer determines a compression ratio for compressing the input image, based on the identified type of the document.

10. A computer-readable, non-transitory medium storing a computer program, wherein the computer program causes a computer to execute a process, the process comprising:
generating an input image by reading a document;
identifying at least, a business card, a receipt, and a plastic card as a type of the document; and
compressing the input image,
determining a compression ratio for compressing the input image, based on the identified type of the document.

* * * * *